March 7, 1961
T. HALL
2,973,633
FLEXIBLE COUPLINGS
Filed Dec. 22, 1959
2 Sheets-Sheet 1
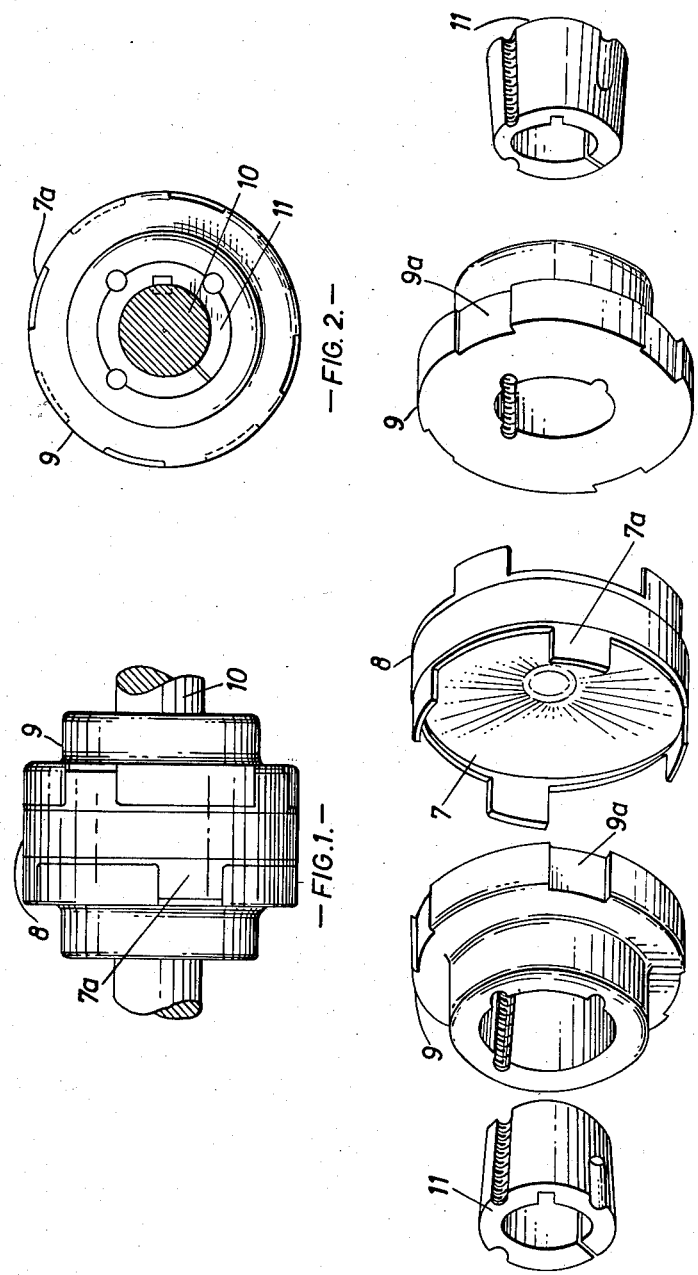
INVENTOR:
THOMAS HALL
BY
Mead, Browne, Schuyler + Beveridge,
Attorneys March 7, 1961  T. HALL  2,973,633
FLEXIBLE COUPLINGS
Filed Dec. 22, 1959  2 Sheets-Sheet 2
— FIG.4.—
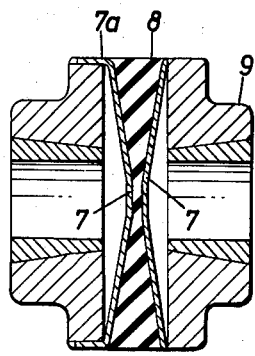
— FIG.5.—
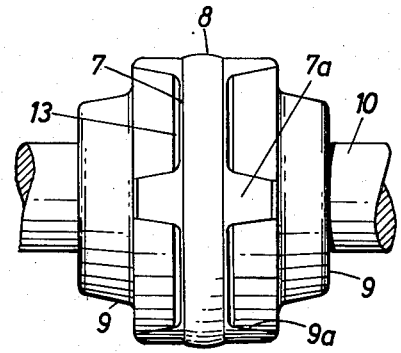
— FIG.7.—
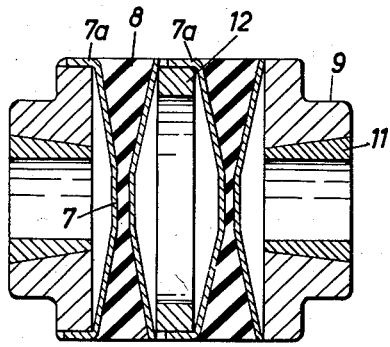
— FIG.6.—
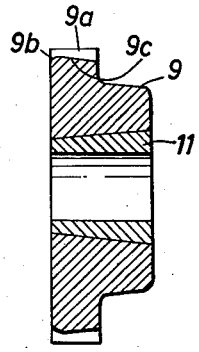
— FIG.8.—
INVENTOR:
THOMAS HALL
BY
Mead, Browne, Schuyler + Beveridge,
Attorneys

2,973,633

FLEXIBLE COUPLINGS

Thomas Hall, Kiama, Keyingham, England, assignor to J. H. Fenner & Co. Limited, Hull, England Filed Dec. 22, 1959, Ser. No. 861,374

Claims priority, application Great Britain Sept. 19, 1959

7 Claims. (Cl. 64—11)

This invention relates to flexible power transmission couplings of the kind comprising a rubber or other flexible component bonded to metal or other rigid end members and in particular to a rubber component having a conical section in conjunction with shaft flanges which incorporate a taper bush fastening device as described in British patent specification No. 592,912 or similar fastening device permitting easy assembly and movement on a shaft.

Generally speaking, existing coupling designs incorporating a rubber element of conical section bonded to the metal portions of the coupling are limited in size and not convenient for boring or assembly, while designs using a rubber element of conical section bonded to separate end plates of machined steel bolted to half couplings are heavy, difficult to assemble and bolt up, and comprise only an annular ring of rubber of conical section and not an element having a full circle area which is necessary to obtain maximum capacity of the coupling.

An object of the invention is to provide an improved flexible coupling.

According to one aspect of the present invention, the flexible component of a flexible coupling comprises a biconcave flexible element disposed between two relatively rigid elements having convex faces united to the concave faces of the flexible element. Normally, the flexible element will be of rubber and the rigid elements of metal.

According to another aspect of the present invention, the rigid elements united to the flexible element are arranged to transmit the drive from a driving flange to a driven flange.

Preferably, a biconcave rubber element is bonded to end plates of relatively light construction, preferably one piece steel pressings, which can be assembled as a single unit between flanges mounted on the driving and driven shafts, the flanges preferably being provided with taper bushes or other device permitting easy movement upon and fixing to the shaft.

The bonded endplates may be adapted to transmit power between driving and driven flanges by means of lugs formed in the steel pressing and disposed at right angles to the plane of the biconcave rubber element, the lugs being arranged to slide into slots or recesses on the periphery of the driving and driven flanges.

The lugs may be protected against fretting and abrasion by covering them with rubber, the rubber providing a cushion between the lug and the corresponding flange slot and minimising damage due to relative movement between the lug and flange. The rubber may be applied either as a separate rubber sleeve assembled over each lug or may be moulded on or bonded to all the lugs of the steel pressing in a single operation.

Alternatively, annular sections, lugs or studs for attaching the flexible component to the flanges in a positive manner can be fastened to the pressed steel endplates in any desired position by various means, such as welding, riveting, screwing or moulding.

A preferred form of lug is arranged so that it has a taper which fits a correspondingly tapered slot or recess on the periphery of the driving or driven flange and the relative dimensions of the lug and slot or recess are such that there is a clearance between the circumference of the endplate and the flange so that only the lug can act upon the flange. The action of the rubber element which expands under torsion maintains the lugs in close contact with the tapering edges of the flange slots or recesses. Further, the bed of each flange slot or recess may be arranged so that the only contact between the lug and the base of the slot or recess is a line contact whereby bending stresses on the lug are reduced to a minimum.

To obtain a wide range of coupling characteristics, the flexible component may be doubled or trebled by provision of a light connecting element adapted to connect and locate the adjacent lugs or other connecting means of each component. A connecting element of this type can be arranged as a spacer ring when this feature is required.

By rubber is meant any of the natural or synthetic polymers used in the rubber and plastics industry and the rigid endplates are not confined to steel pressings but may be of any material which is rigid at normal drive temperatures.

The invention will now be further described with reference to the accompanying drawings in which:

Fig. 1 is a side elevation of a flexible coupling according to the invention,

Fig. 2 is an end view of the coupling shown in Fig. 1,

Fig. 3 is an exploded perspective view of the coupling shown in Figs. 1 and 2,

Fig. 4 is a sleeve for use with the coupling of Figs. 1 to 3,

Fig. 5 is a side elevation in section of the coupling shown in Figs. 1 to 3,

Fig. 6 is a side elevation in section of a form of flexible coupling alternative to that shown in Fig. 5, Fig. 7 is a side elevation of a modification of the flexible coupling shown in Fig. 1, and Fig. 8 is a side elevation in section of one of the flanges shown in Fig. 7.

In the drawings like numbers refer to like parts.

Referring firstly to Figs. 1 to 3 and 5, conical steel elements 7 are bonded to a rubber element 8 to form a flexible component for the coupling. Elements 7 carry lugs 7a which engage in slots 9a of flanges 9. Flanges 9 are mounted on driving and driven shafts 10 by means of tapered bushes 11 each of which is keyed on to the shaft. Each tapered bush 11 fits within the tapered bore of the flange 9 and wedges the flange on to the shaft in the manner described more fully in British patent specification No. 592,192.

The rubber sleeve shown in Fig. 4 may be fitted to each of lugs 7a so preventing metal to metal contact between the lugs and the slots 9a and providing a further degree of resilience in the coupling.

In the construction of Fig. 6 there are two rubber elements 8 bonded to conical steel elements 7, the lugs 7a of which engage in the slots of flanges 9 and in the slots of an intermediate element 12, disposed between the two elements 8.

In Figs. 7 and 8, the lugs 7a are tapered and fit tightly into correspondingly tapered slots 9a, the relative dimensions of the lug and slot being such that a clearance 13 is obtained between the circumference of the element 7 and the flange 9. The bed of the slot 9a is given a clearance radius 9b on the edge which is disposed adjacent to the element 7 and a slope 9c towards the other edge. The junction of surfaces 9b and 9c forms a line contact for lug 7a.

I claim:

1. A flexible coupling comprising a driving shaft, a driven shaft arranged in driving relationship with said driving shaft, a driving flange mounted on the driving shaft, a driven flange mounted on the driven shaft, each flange having recesses in its periphery, and a flexible component disposed between said flanges, said flexible component comprising two relatively rigid elements and a flexible element disposed between and fixed to said rigid elements, and said rigid elements carrying peripheral lugs fitting the recesses in the flanges and arranged to transmit drive from the driving flange to the driven flange.

2. A flexible coupling as claimed in claim 1 in which taper bushes are inserted between the flanges and the shafts, said bushes wedging the flanges onto the shafts.

3. A flexible coupling comprising a driving shaft, a driven shaft arranged in driving relationship with said driving shaft, a driving flange mounted on the driving shaft, a driven flange mounted on the driven shaft, each flange having recesses on its periphery, and a flexible component disposed between said flanges, said flexible component comprising two metal elements having convex faces and a biconcave flexible rubber element disposed between the two metal elements, the convex faces of the metal elements being united to the concave faces of the rubber element and the metal elements carrying on their peripheries lugs fitting the recesses in the flanges and arranged to transmit drive from the driving flange to the driven flange.

4. A flexible coupling as claimed in claim 3 in which the lugs are covered with rubber to provide a cushion between each lug and the flange recess in which it fits.

5. A flexible coupling comprising a driving shaft, a driven shaft arranged in driving relationship with said driving shaft, a driving flange mounted on the end of the driving shaft, a driven flange mounted on the end of the driven shaft, each flange having recesses on its periphery and each recess being tapered towards the side of the flange from which the shaft extends, and a flexible component disposed between said flanges, said flexible component comprising two metal elements having convex faces and a biconcave flexible rubber element disposed between the two metal elements, the convex faces of the metal elements being united to the concave faces of the rubber element, and the metal elements carrying on their peripheries tapered lugs fitting the recesses in the flanges and arranged to transmit drive from the driving flange to the driven flange, the relative dimensions of the lugs and flange recesses being such that there is a clearance between the perimeter of each metal element and its corresponding flange.

6. A flexible coupling as claimed in claim 5 in which the bed of each flange recess is arranged so that the only contact between the corresponding lug and the base of the recess is a line contact.

7. A flexible coupling comprising a driving flange, a driven flange, an intermediate element disposed between the driving flange and the driven flange, each flange and the intermediate element having recesses in its periphery, and two flexible components, one of which is disposed between the intermediate element and the driving flange and the other of which is disposed between the intermediate element and the driven flange, each flexible component comprising two relatively rigid elements and a flexible element disposed between and fixed to said rigid elements, said rigid elements carrying peripheral lugs fitting the recesses in the flanges and the intermediate element and arranged to transmit drive from the driving flange to the driven flange via the intermediate element.

References Cited in the file of this patent

UNITED STATES PATENTS

| | | |
|---|---|---|
| 1,790,516 | Williams | Jan. 27, 1931 |
| 2,207,496 | Anderson | July 9, 1940 |

FOREIGN PATENTS

| | | |
|---|---|---|
| 586,599 | Great Britain | Mar. 25, 1947 |